(12) United States Patent
Wong et al.

(10) Patent No.: US 9,544,620 B2
(45) Date of Patent: *Jan. 10, 2017

(54) SYSTEM AND METHOD TO EASILY RETURN TO A RECENTLY-ACCESSED SERVICE ON A SECOND DISPLAY

(75) Inventors: Ling Jun Wong, Champaign, IL (US); Charles McCoy, Coronado, CA (US); True Xiong, San Diego, CA (US)

(73) Assignees: SONY CORPORATION, Tokyo (JP); SONY NETWORK ENTERTAINMENT INTERNATIONAL, Los Angeles, CA (US)

( * ) Notice: Subject to any disclaimer, the term of this patent is extended or adjusted under 35 U.S.C. 154(b) by 255 days.

This patent is subject to a terminal disclaimer.

(21) Appl. No.: 13/207,581

(22) Filed: Aug. 11, 2011

(65) Prior Publication Data
US 2012/0210375 A1    Aug. 16, 2012

Related U.S. Application Data

(60) Provisional application No. 61/441,910, filed on Feb. 11, 2011.

(51) Int. Cl.
*H04N 21/222* (2011.01)
*H04N 21/418* (2011.01)
(Continued)

(52) U.S. Cl.
CPC ........ *H04N 21/222* (2013.01); *H04N 21/4126* (2013.01); *H04N 21/4182* (2013.01);
(Continued)

(58) Field of Classification Search
CPC .................... H04N 21/25816; H04N 21/4182; H04N 21/222; H04N 21/64322; H04N 21/47217; H04N 21/4126
See application file for complete search history.

(56) References Cited

U.S. PATENT DOCUMENTS 5,659,350 A * 8/1997 Hendricks et al. ........... 725/116
8,146,119 B2    3/2012 White et al.
(Continued)

FOREIGN PATENT DOCUMENTS

CN    101069171    11/2007
CN    101129051    2/2008

OTHER PUBLICATIONS

"Media Link Player, the DLNA/UPnP Client . . . ", published Dec. 3, 2010 at http://www.alpha.eo.jp/biz/products/dlna/mlplayer/en/, retrieved Jan. 31, 2015.
(Continued)

*Primary Examiner* — Pinkal R Chokshi
(74) *Attorney, Agent, or Firm* — Mark D. Wieczorek; Mayer & Williams PC

(57) ABSTRACT

Apparatus and methods are provided to implement a technique for using a second display with a content playback device. In one implementation, this feature allows users to easily return to a recently-accessed service when browsing on a second display. The most recent service may appear at the top of the list. Such systems and methods may be particularly advantageous when a user normally only visits a few services in an entire list of available services on a regular basis. The recently-accessed service may be specific to the user account, a user profile within the user account, the second display, or the content playback device. In some implementations, the second display may be a smart phone that can often be found beside the user, a laptop or tablet PC, or the like.

25 Claims, 8 Drawing Sheets

(51) Int. Cl.
*H04N 21/41* (2011.01)
*H04N 21/472* (2011.01)
*H04N 21/643* (2011.01)
*H04N 21/258* (2011.01)

(52) U.S. Cl.
CPC . *H04N 21/47217* (2013.01); *H04N 21/64322* (2013.01); *H04N 21/25875* (2013.01)

(56) References Cited

U.S. PATENT DOCUMENTS

| | | | |
|---|---|---|---|
| 8,327,403 B1* | 12/2012 | Chilvers | H04N 21/4334 725/104 |
| 8,346,924 B1* | 1/2013 | Bucher | H04L 12/5695 707/781 |
| 2002/0056098 A1* | 5/2002 | White | H04N 5/44 725/39 |
| 2006/0080408 A1* | 4/2006 | Istvan | G06F 17/30861 709/219 |
| 2006/0098795 A1* | 5/2006 | Choti et al. | 379/114.14 |
| 2006/0161635 A1 | 7/2006 | Lamkin et al. | |
| 2006/0185004 A1 | 8/2006 | Song | |
| 2006/0230427 A1* | 10/2006 | Kunkel | H04N 5/44543 725/133 |
| 2007/0011714 A1* | 1/2007 | Fellows | 725/113 |
| 2007/0028278 A1 | 2/2007 | Sigmon et al. | |
| 2007/0089057 A1 | 4/2007 | Kindig | |
| 2007/0124792 A1* | 5/2007 | Bennett | H04M 1/0233 725/133 |
| 2007/0157247 A1 | 7/2007 | Cordray et al. | |
| 2008/0010372 A1 | 1/2008 | Khedouri et al. | |
| 2008/0117922 A1 | 5/2008 | Cockrell | |
| 2008/0162655 A1 | 7/2008 | Khedouri et al. | |
| 2009/0055426 A1 | 2/2009 | Kalasapur | |
| 2009/0077583 A1* | 3/2009 | Sugiyama | H04N 5/4403 725/39 |
| 2009/0089353 A1 | 4/2009 | Fukuta et al. | |
| 2009/0132610 A1 | 5/2009 | Bedingfield, Sr. | |
| 2009/0216351 A1 | 8/2009 | Van Horck | |
| 2009/0222757 A1* | 9/2009 | Gupta et al. | 715/776 |
| 2009/0235298 A1 | 9/2009 | Carlberg et al. | |
| 2009/0249208 A1 | 10/2009 | Song et al. | |
| 2010/0031162 A1* | 2/2010 | Wiser et al. | 715/747 |
| 2010/0050219 A1* | 2/2010 | Angiolillo et al. | 725/100 |
| 2010/0082561 A1 | 4/2010 | Rauber | |
| 2010/0106730 A1 | 4/2010 | Aminian et al. | |
| 2010/0205628 A1 | 8/2010 | Davis et al. | |
| 2010/0220769 A1 | 9/2010 | Sato | |
| 2010/0262986 A1 | 10/2010 | Adimatyam et al. | |
| 2010/0281506 A1* | 11/2010 | Schmidt et al. | 725/46 |
| 2010/0306811 A1 | 12/2010 | Adimatyam et al. | |
| 2010/0312861 A1 | 12/2010 | Kolhi et al. | |
| 2011/0060998 A1 | 3/2011 | Schwartz | |
| 2011/0154464 A1* | 6/2011 | Agarwal | H04L 63/0815 726/8 |
| 2012/0079529 A1* | 3/2012 | Harris et al. | 725/32 |
| 2012/0144416 A1* | 6/2012 | Wetzer et al. | 725/14 |
| 2013/0014190 A1 | 1/2013 | Sansom et al. | |
| 2013/0254207 A1 | 9/2013 | Coburn, IV | |
| 2013/0254813 A1 | 9/2013 | Harwell et al. | |

OTHER PUBLICATIONS

"Latest News—Wild Media Server (UPnP, DLNA, HTTP)", published Sep. 7, 2010 at http://www.wildmediaserver.com/news/php,retrieved Jan. 31, 2015.

w Travis Illig, "Creating Playlists in Asset UPnP", published Sep. 26, 2010 at http://www.paraesthesia.com/archive/2010/09/26/creating-playlists-in-asset-upnp.aspx/, retrived Jan. 31, 2015.

* cited by examiner

SYSTEM AND METHOD TO EASILY RETURN TO A RECENTLY-ACCESSED SERVICE ON A SECOND DISPLAY

CROSS-REFERENCE TO RELATED APPLICATIONS

This application claims benefit of priority of U.S. Provisional Patent Application Ser. No. 61/441,910, filed Feb. 11, 2011, entitled "METHOD TO EASILY RETURN TO A RECENTLY-VISITED SERVICE ON A SECOND DISPLAY", owned by the assignee of the present application and herein incorporated by reference in its entirety.

BACKGROUND

Internet delivery of digital content to IPTVs continues to increase, as does the popularity of IPTVs themselves. Digital content delivery is generally performed from content service providers. When a user browses such content service providers, the user normally only has a few services which they will regularly use. But if a service is desired to be accessed multiple times, the user is generally required to navigate to the service, find a desired asset, and commence playback each time. For often-accessed services, this often becomes inconvenient.

SUMMARY

Systems and methods are provided that allow a user to easily return to a recently-accessed service when browsing on a second display. The most recent service accessed may appear by itself or at the top of a list of recently-accessed services. The list may be specific to a device or common across all devices registered under the user. This feature provides a better user experience, and is a useful feature at least in part because a user normally only visits a few services in the entire list of available services on a regular basis.

In one implementation, the following steps may be performed. A user loads a second display application, e.g., a web application, and selects a service for browsing. The second display sends the service information to a server. The server stores the information and associates it with the user and the device. The second display may also store this information locally in the second display application. On subsequent user logins, the second display requests the list from the server. The server returns the list of recently-viewed services to the second display, and the list is populated with the most recent service first. In some implementations, only service identifications may be stored and returned, in which case the second display application can retrieve any additional needed service information from the existing service list or from another source. When the user selects a service from the list of recently-viewed services, the second display automatically loads the service. An asset chosen from the loaded service may then be selected and played back on a content playback device, e.g. an IPTV.

Variations of the system and method may be seen. For example, the determination of the recently-accessed services may be on the basis of the second display, the user, a group of users, or the content playback device. For example, if based on the content playback device, recently-accessed services which were the source of content items recently played on the content playback device may be displayed. For a user account, recently-accessed services on any devices, second displays or content playback devices, may be displayed as an overall cumulative ranking system for the user account or for a user profile within the user account, i.e., related to a particular family member or group member associated with the user account. In the case of a second display, the list displayed may pertain to services recently-viewed or accessed by the user or by others using that second display. It is noted that the term "accessed" refers to a user viewing or interacting with the service, even if an asset is not played back from the service.

The displayed list may be filtered based on the capability of a selected device to play back content from the displayed services, if a device has been so selected. In some cases, where a device is capable of playing back a content item from a service listed but cannot do so for business reasons, i.e., a lack of affiliation with the service, the user may be prompted to create such an affiliation. Other such situations include where a country or region has enacted various content restrictions or where a user has not opted in to a service. In this case, the second most recently-viewed service may be displayed, or the first service with viewable content. Alternatively, the complete list including inaccessible services may be displayed, but with a notation that such services are currently unavailable.

In some implementations, a user may choose to have displayed a category of services based on the most recently-viewed service, or the user may configure the system and method to display not only a recently-viewed service but also a recently-viewed category within the service. To enable these possibilities, the user may provide their choices in an option list or the same may be automatically performed by the system and method using other details of the user profile.

In one method of implementation, each service identification may have associated therewith a time stamp corresponding to the time of access. By comparing these time stamps, the last-in-time service may be determined and either accessed or displayed on a list for potential access, with a suitable user prompt. In other variations, the timestamp may provide an expiry date for services so that the system may be organized by periodic cleaning procedures. Distinctions may be made and employed regarding which second display accessed the service, which content playback device played an asset from the service, or which user accessed the service, the last by employment of a user profile within the user account. In other words, different most recently-accessed services may be displayed for different users, or as tied to different devices. In this way, different types of lists may be maintained and displayed, and the same may be combined in any manner desired. A global or user-specific list may be particularly pertinent where a user is moving from one room to another, and wishes to continue accessing a service from room-to-room.

The second display provides complementary functionality to the IPTV, and generally does not require additional investment by the user because the same make use of a device, e.g., a smartphone, laptop computer, tablet computer, an internet appliance, etc., which most users would already have in their possession. Such a second display provides a complementary functionality to a content playback device such as an IPTV because of the second display's strength in supported languages and character font sets, data entry, processing power, and user experience in content management.

Where the second display application is a web application, the same may be scripting or non-scripting. The second display application may also be a Java application or any other sort of application that may communicate with a server. For example, the ASP/.NET framework with RPC can be employed to write the second display application. Where the web application running on the second display is written in HTML or HTML with Javascript, the same may be loaded by any device with a browser, and so the same is not limited to only a small set of compatible devices or expensive remote controls. Where a smartphone is employed, a mobile version of the second display user interface may be employed, with an appropriate listing of fields and an appropriate mobile resolution.

Communications with service providers may take place through a proxy server, and the proxy server presents to service providers the authentication credentials of the content playback device, so that the second displays appear to the service providers as authenticated content playback devices.

As noted above, the second displays may include any device that can run an application that communicates with a content playback device, including, but not limited to, personal computers, laptop computers, notebook computers, netbook computers, handheld computers, personal digital assistants, mobile phones, smart phones, tablet computers, hand-held gaming devices, gaming consoles, Internet appliances, and also on devices specifically designed for these purposes, in which case the special device would include at least a processor and sufficient resources and networking capability to run the second display application.

The content playback device can take many forms, and multiple content playback devices can be coupled to and selected within a given local network. Exemplary content playback devices may include IPTVs, DTVs, digital audio systems, or more traditional video and audio systems that have been appropriately configured for connectivity. In video systems, the content playback device includes a processor controlling a video display to render content thereon.

In a general method, a user employing a second display has a user account with a source or clearinghouse of services. Here, the source or clearinghouse is represented as a user account on a management server, but it should be understood that the user account may be with a service provider directly. The user account may have information stored thereon related to what content playback devices are associated with the user account. When a user logs on, they may see this list of content playback devices and may choose a particular content playback device. If there is only one content playback device on the network, or if the user is browsing in a way that the content playback device identity is not needed, then this step may be omitted. Moreover, a user may control content playback devices that are not included in a user account. For example, content playback devices may be discoverable and controllable, e.g., via infrared or Bluetooth® or otherwise, that are not part of the user account with a management server or with a service provider. It may even be possible for a user to play back content on such a content playback device, if a service provider has made available content that can be delivered without access made to a user account.

Once a content playback device has been chosen, a list of services may be displayed. The list of services may be customized to those that have content playable on the chosen content playback device, or all available content may be displayed, in which case, e.g., a notation may be displayed adjacent the asset as to whether it is playable on the selected device. In particular, in certain systems, methods, and implementations described here, a list of services may be displayed based on which services have been recently-accessed by the user.

Where no content playback device has been selected, all available content may be displayed. If no content playback device has been selected, but the user account includes stored information about which content playback devices are available, then all content may be displayed, a subset of all content may be displayed based on the known content playback devices associated with the account, or notations may be presented about which content playback devices can play which content, or a combination of these. In some cases, a content service provider may require a content playback device to be chosen so as to determine if content from that service provider may be played back. In other cases, no content playback device need be chosen and the user may simply choose and queue content for later playback by a content playback device to-be-determined at a later time.

Assuming multiple services are available, the user then selects a service to browse. In many cases, access to a service requires becoming affiliated with the service. Details of such affiliation processes are provided in U.S. patent application Ser. No. 12/982,463, filed Dec. 30, 2010, entitled "Device Registration Process from Second Display", owned by the assignee of the present application and incorporated by reference herein. Once the content playback device is affiliated with services, the user may choose which service they wish to browse. Where a content playback device has not been chosen, the user may still choose services and browse, but the content offerings may be less specific to a given content playback device. The service presents a list of available assets. The presentation may be in any number of forms, including by category, by keyword, or in any other form of organization. The proxy server presents an authentication credential of the content playback device to the content server. In some cases, credentials for accessing the various services may be stored in the user account, and presented by the proxy server or management server to the content server when needed.

Individual services may employ their own DRM schemes which the current systems and methods may then incorporate. For example, if a video content service provider only allows a predetermined number of devices on which their content may be played back, then this rule may be enforced or duplicated within the context of the current system and method. Moreover, changes to such service provider rules or other parameters may be periodically polled for by the proxy server and/or management server, or the same may be polled for at a subsequent login of the service, e.g., at the time the affiliation is renewed. In other words, upon login, the system and method may poll for and receive a token associated with the given service provider, the token providing information to the system about the service provider as well as about the user account with the service provider.

The system and method may include a management server as mentioned above which, along with the content playback device, communicates with at least one content server such that the content server provides assets for presentation at the content playback device. The system and method may further include a proxy server communicating with the management server and the second displays. In some cases, the proxy server may be merged with the management server, or in other cases a separate proxy server may be provided for each content server or service provider.

In one implementation, the invention is directed towards a method of enabling a user to return to a recently-accessed service, including steps of: upon access of a service on one second display, logging a notation of the access along with a time stamp on a list, such that a recently-accessed list is created, the recently-accessed list stored on a management server, the management server providing access to a plurality of service providers; and upon request by a second display, providing the recently-accessed service list for display on the same or another second display.

Implementations of the invention may include one or more of the following. The providing may include generating a recently-accessed service list including formatting the recently-accessed service list for display on a number of different types of second displays, the types of second displays including: a tablet computer, a smart phone, a laptop computer, an internet appliance, or a computing device with internet access. The access of a service on one second display may include playback of an asset from an accessed service on a content playback device, and the logging may be performed upon the playback of the asset. The providing may further include ordering the generated recently-accessed service list according to timestamp. The method may further include receiving a request for a service on the recently-accessed service list to be accessed, the request sent from the one or another second display. The method may further include causing the requested service to be accessed. At least one service on the recently-accessed list may have associated therewith an expiration date, and the method may further include, on or after the expiration date, removing the service from the recently-accessed service list. The method may further include logging data about a second display, content playback device, user account, or user profile associated with the access, and the recently-accessed service list may be specific to the second display, content playback device, user account, or user profile, respectively. The logging may include data about a current location within the accessed service, such that upon a subsequent request for the service, the service access begins at the current location, e.g., a category page. The logging may include data about a current location, and the method may further include, upon a subsequent request to access the service, displaying a prompt on the second display requesting the service, inquiring as to whether access should start at a homepage of the service or at the current location. The method may further include filtering the generated list based on a regional ruleset corresponding to a region in which the content playback device resides.

In another aspect, the invention is directed to a non-transitory computer-readable medium, including instructions for causing a computing device to implement the above method.

In another aspect, the invention is directed to a method of enabling a user to access a recently-accessed service on a second display, including: upon access of services on one second display, transmitting data about the services to a management server, the management server providing access to a plurality of service providers; and displaying on the one or another second display a most recently-accessed service or a list, the list including entries corresponding to the most recently-accessed services.

Implementations of the invention may include one or more of the following. The second display may be a tablet computer, a smart phone, a laptop computer, an internet appliance, or a computing device with internet access. The method may further include associating a timestamp with the transmitted data, and may further include ordering the list on the second display according to timestamp. The method may further include transmitting a request to access a service on the list. The method may further include transmitting a current location in the service to the management server. The method may further include: transmitting a request for a service on the list; receiving a request for user input, the request inquiring as to whether access of the service should be at a homepage of the service or at the current location; and transmitting a response to the request for user input to the management server. The list may be specific to the second display, specific to a user account, or specific to a user profile on the user account. The list may also be specific to a content playback device or to a category of content playback devices. The method may further include filtering the recently-accessed service list based on a regional ruleset corresponding to a region in which a content playback device associated with the user account resides.

In another aspect, the invention is directed to a non-transitory computer-readable medium, including instructions for causing a computing device to implement the above method.

Advantages of certain embodiments of the invention may include one or more of the following. Systems and methods according to the principles described here provide a global solution for content management, and in particular allow a set of services to be queued in a recently-accessed service list, allowing convenient access to such services. The systems and methods allow a user to more quickly access commonly-used services, even on a new content playback device, because the same will have access to the user account immediately upon registration with a management server infrastructure.

Other advantages will be apparent from the description that follows, including the figures and claims.

BRIEF DESCRIPTION OF THE DRAWINGS

Like reference numerals denote like elements throughout.

DETAILED DESCRIPTION

Figure 1:
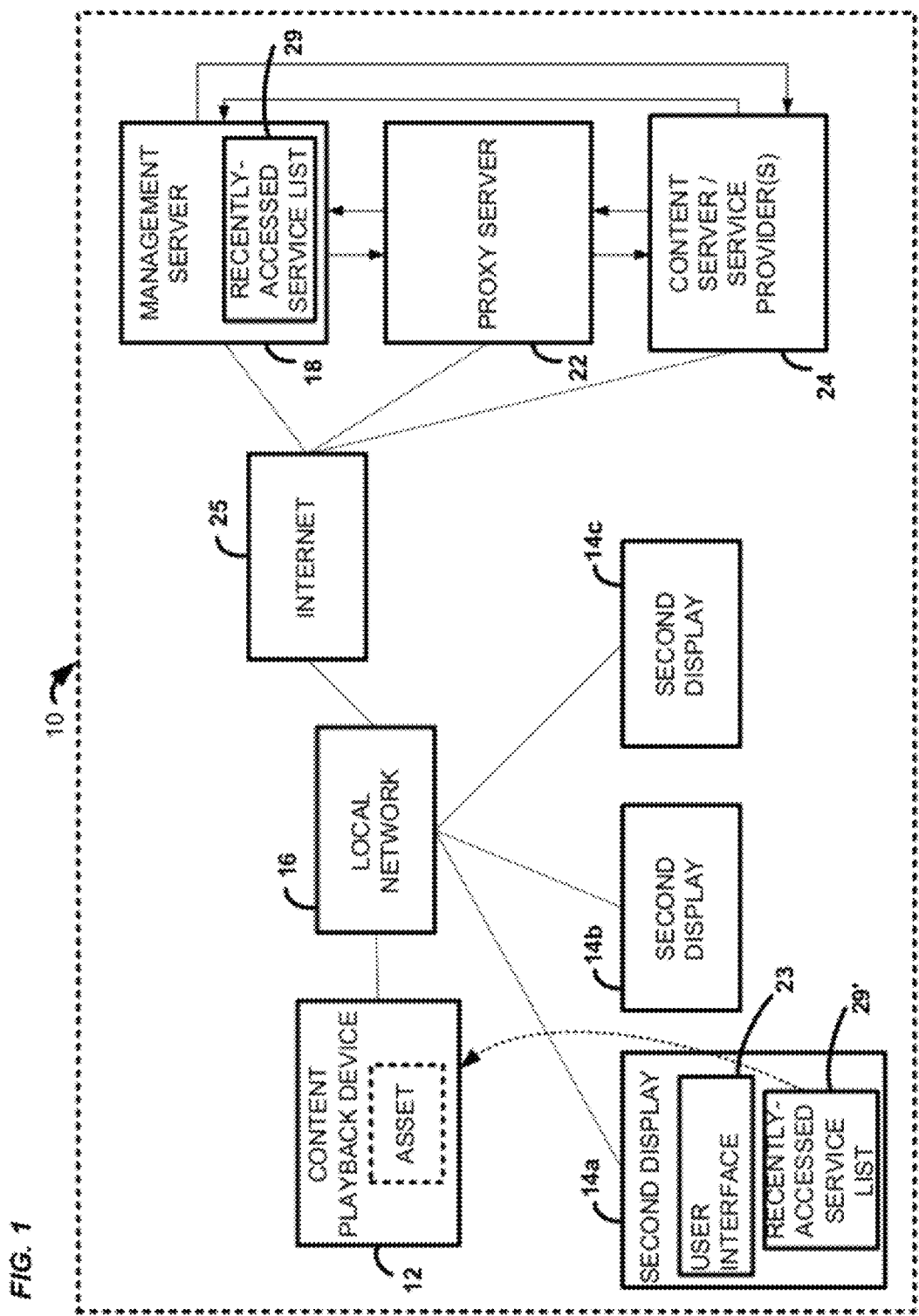
FIG. 1 is a block diagram of an exemplary system in accordance with one aspect of the present principles.

Referring initially to FIG. 1, a system 10 is shown including a content playback device 12 coupled to a local network 16, which may be wired, wireless, or a combination of both. Also coupled to the local network 16 are one or more second displays 14a-14c, an exemplary one of which is termed herein second display 14i. A number of servers may be accessed by the content playback device 12 and the second display 14i through the local network 16 and the internet 25, including a management server 18, a proxy server 22, and one or more content servers 24 corresponding to service providers (only one is shown in FIG. 1).

The second display 14a includes a user interface 23 for a second display application which when launched may in turn control in a number of aspects of service selection and content playback. In one aspect, according to the principles described here, the user interface may display a recently-accessed service list 29', the list including services that have been recently-accessed by the user, and which corresponds to a recently-accessed service list 29 of services stored on the management server 18. Different ways in which the recently-accessed service list may be generated, stored, updated, maintained, and used are described below.

Using this system 10 of FIG. 1, a user of the second display 14a is provided with a convenient way to resume access of a recently-accessed service. In this way, the user is saved the inconvenience of having to navigate through a large list of services, find the service, and arrange for access of the same. Moreover, the convenient and flexible user interface 23 of the second display 14a may then be leveraged to choose and navigate through a service to select content for playback on the content playback device 12.

Details of individual components are now described.

The content playback device 12 may be, e.g., an IPTV, a digital TV, a digital sound system, a digital entertainment system, a digital video recorder, a video disc player, a combination of these, or any number of other electronic devices addressable by a second display or other control on the local network 16. For the sake of simplicity, in this specification, the content playback device 12 will generally be exemplified by an IPTV, in which case the same will typically include a processor that controls a visual display and an audio renderer such as a sound processor and one or more speakers. The processor may access one or more computer-readable storage media such as but not limited to RAM-based storage, e.g., a chip implementing dynamic random access memory (DRAM), flash memory, cloud-based storage, or disk-based storage. Software code implementing present logic executable by the content playback device 12 may also be stored on one or more of the memories disclosed below to undertake present principles. The processor can receive user input signals from various input devices including a remote control device, a point-and-click device such as a mouse, a keypad, etc. A TV tuner may be provided in some implementations, particularly when the content playback device 12 is embodied by an IPTV, to receive TV signals from a source such as a set-top box, satellite receiver, cable head end, terrestrial TV signal antenna, etc. Signals from the tuner are then sent to the processor for presentation on the display and sound system. A network interface such as a wired or wireless modem communicates with the processor to provide connectivity to the Internet through the local network 16. It will be understood that communications between the content playback device 12 and the internet 25, or between the second display 14i and the internet, may also take place through means besides the local network 16. For example, the second display 14i may communicate with the content playback device 12 through a separate mobile network.

The one or more second displays 14a-14c each bear a processor and components necessary to operate an application for, e.g., service provider and content selection, as well as for display of a recently-accessed list of services. In particular, the processor in the second display may access one or more computer-readable storage media such as but not limited to RAM-based storage, e.g., a chip implementing dynamic random access memory (DRAM), flash memory, or disk-based storage. Software code implementing present logic executable by the second display may also be stored on one of the memories disclosed below to undertake present principles. Further, the second display 14i can receive user input signals from various input devices including a point-and-click device such as a mouse, a keypad, a touchscreen, a remote control, etc. The second display 14i may also receive user commands via the internet, such as via a remote control. For example, in some cases, remote data entry may be performed, or a command may be triggered, on a second display from a remote location via the internet. A network interface such as a wired or wireless modem communicates with the processor to provide connectivity to the local network and to wide area networks such as the Internet as noted above.

The servers 18, 22, and 24 have respective processors accessing respective non-transitory computer-readable storage media which may be, without limitation, disk-based and/or solid state storage. The servers communicate with a wide area network such as the Internet via respective network interfaces. The proxy server 22 may in some cases be combined with the management server 18, although in many cases it may be preferable to separate the servers to better accommodate server load. The servers may mutually communicate via the internet 25. In some implementations, the servers may be located on the same local network, in which case they may communicate with each other through the local network without accessing the internet. For example, in one exemplary implementation, the management server 18 and the proxy server 22 may be disposed in the same data center, so communication between the two may stay within the data center.

While an exemplary method of the system is described below, certain method steps especially pertinent to certain arrangements of the second display will be described here. Responsive to the second display 14i sending a request to the proxy server 22 for an executable utility, the proxy server 22 returns the utility to each second display 14i. Running the utility causes the initialization of an application. The implementation discussed here includes a web application, but it will be understood that other types of applications may also be employed.

The second display 14i, executing the web application, prompts a user to input to each second display 14i login information. The login information may be common or may differ between second displays. The proxy server 22, responsive to reception of correct login information from the content playback device 12, returns the local IP address of the content playback device 12 to the second display 14i, because the same has previously been registered to a user account in which such information is maintained. The proxy server 22 may also return an external IP address. In this way, communications may be allowed from outside the local network, e.g., by a second display to a content playback device.

The proxy server 22 may also return a list of content playback devices on the local network, responsive to which the second display 14i may select one for content playback. In turn, each second display 14i uses the local content playback device address to access the content playback device 12 directly to request information about the content playback device 12, which information is returned from the content playback device 12 to the second display 14i such that the local address of the content playback device 12 need not be globally addressable. Each second display 14i may also select content for playback on different content playback devices. The second display 14i sends the information about the content playback device 12 to the proxy server 22, requesting a list of services available to the content playback device 12 from one or more service providers. The services may be dependent on the device characteristics of the content playback device 12 chosen. For example, if the chosen content playback device 12 is an IPTV, video services may be returned. If the chosen content playback device 12 is an audio system, audio services may be returned.

The proxy server 22 relays the request for a list of services to the management server 18, which returns the list to the proxy server 22, with the proxy server 22 in turn sending the list to the second display 14i for presentation of information on the second display 14i. Where the request is for a list of recently-accessed services, either via a specific request by a user or an automatic request by the system, the recently-accessed list is returned. Responsive to a user selection of an item on the list, the second display 14i sends a request for a software asset corresponding to the selected asset to the proxy server 22. The proxy server 22 requests a service login of the content server 24 providing the content, and the content server 24 provides to the proxy server 22 a list of assets, categories, or services, and the proxy server 22 relays the list to the second display 14i, which is presented on the second display 14i so that the user can navigate to enter a selection. Responsive to the selection, the second display 14i sends a command to the content playback device 12 to access and play back the selection.

The command to play the local asset may be in a number of forms. The second display 14i may communicate to the proxy server 22 the request on behalf of the content playback device 12, and this request may be via the local network or via other means. Alternatively, the second display 14i may transmit a request to the content playback device 12 that it itself formulates the request, and this transmission may be by way of the local network, the internet generally, or via other means such as other wired or wireless transmission schemes, including via USB, IR, Bluetooth®, or any other schemes. If the second display 14i is configured to address the content playback device 12 at a non-local level, e.g., at the server level, then the second display 14i may be physically located virtually anywhere and still be able to queue content or to command the content playback device 12 to play content. In this case, however, server load would increase over the case where the second display and content playback device communicated directly or over a local network.

Certain method steps of an arrangement of the content playback device are described here. Using a network interface, the content playback device 12 can communicate with a management server 18 on the Internet and with one or more content servers 24, also on the internet and communicating with the management server 18. The management server 18 receives and stores a local IP address of the content playback device 12. The content playback device 12 communicates with the management server 18 to arrange for assets from the content server 24, operated by a service provider, to be played back on the content playback device 12. In more detail, in one embodiment, the content playback device 12 sends login information to the management server 18 which returns to the content playback device 12 a user token that must subsequently be presented by the content playback device 12 to the content server 24 to obtain content from the content server 24.

Figure 2:
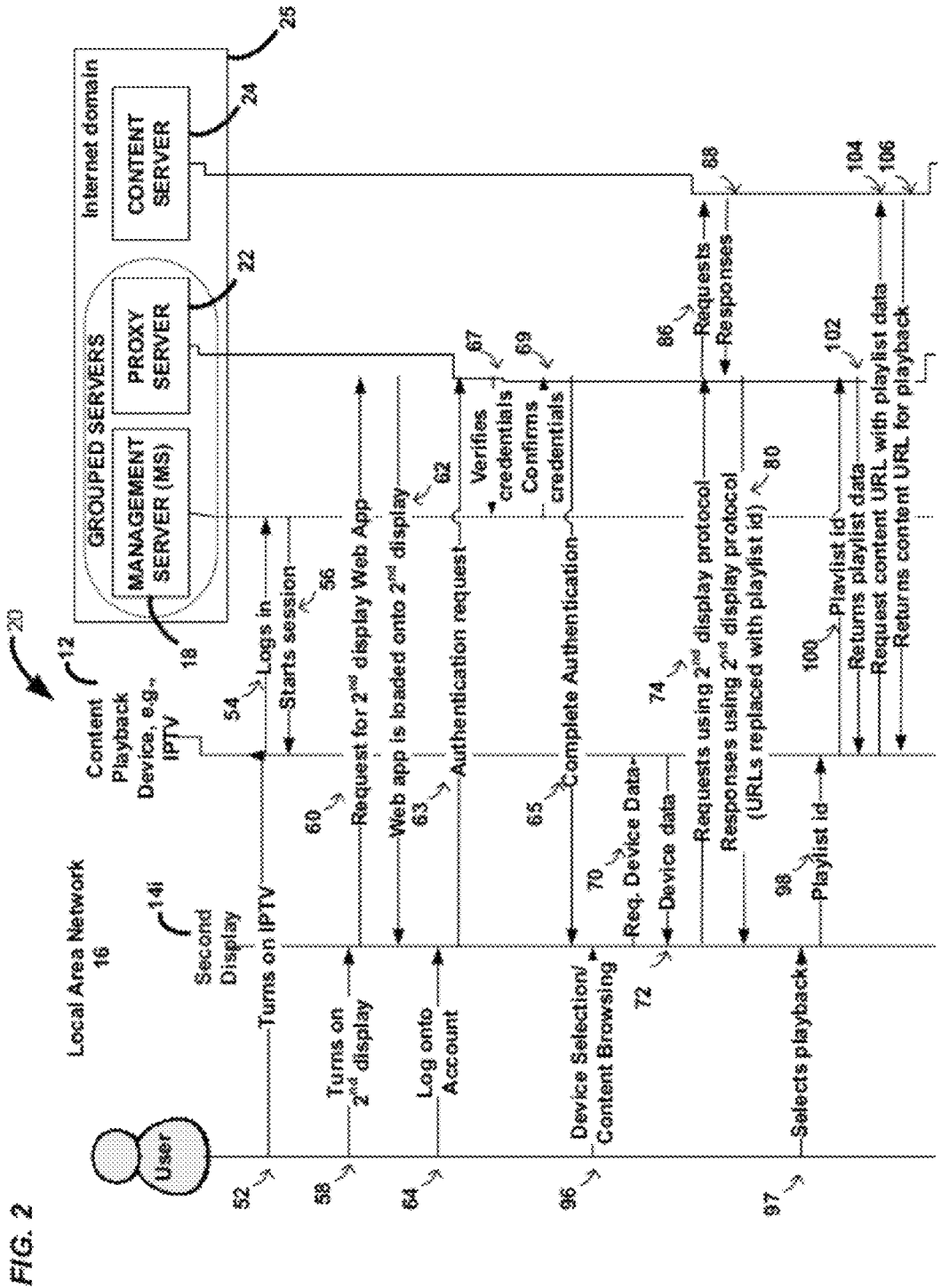
FIG. 2 is a sequence diagram illustrating a system and method according to another aspect of the present principles.

FIG. 2 is a sequence diagram illustrating an exemplary implementation of a method for enabling a user to employ a second display to browse content playback devices, service providers, and assets and select the same for playback by a content playback device. FIG. 2 assumes that the user has already created an account with a management server and has affiliated one or more content playback devices with that account.

At state 52, a user turns on the content playback device 12. At state 54 the content playback device sends login information including, e.g., username and password, to the management server 18, which at state 56 returns to the content playback device a user token that may subsequently be presented by the content playback device to a content server 24 to obtain content from that server. The management server 18 in addition stores the local IP address of the content playback device 12.

At state 58, the user turns on the second display 14i and instantiates a web browser session in which control may be exercised over the content playback device. Other types of sessions may also be employed as has been noted. A utility is executed on the second display 14i, at state 60, which sends a request to the proxy server 22, which returns in state 62 a web application, e.g., HTML with JavaScript, for the second display to execute for browsing services and assets. This application may make, e.g., asynchronous JavaScript and XML calls to the proxy server 22 and to the content playback device 12 to obtain information to control the content playback device 12.

At state 64, using the JavaScript received from the proxy server 22, the second display 14i prompts the user to input to the second display 14i the account login information, including, e.g., the same username and password that the content playback device provided to the management server 18 in state 54 during device registration. Of course, the account login information may differ as well. The user may be prompted to cache login information as well. It will be appreciated that the servers 18, 22, and 24 communicate necessary account information between them as needed to realize the principles described here.

The proxy server 22 responds to a correct user name and password from the second display 14i in an authentication request state 63. The proxy server 22 verifies the user name and password with the management server 18 (states 67 and 69), creates and transmits a session token to the second display, obtains information about content playback devices affiliated with the user account, and completes the authentication in state 65. The proxy server 22 may return to each second display the information about all content playback devices 12 that are affiliated with the user account associated with the user name and password, including their local IP addresses which were stored by the management server 18 after login at 54 (and subsequently provided to the proxy server 22). In more detail, the proxy server 22 sends a token to the second display 14i, the token associated with a content playback device, and this token is communicated in future transactions between the second display and the proxy server, so that the proxy server 22 knows what content playback device the asset is intended for. Each user with each second display may then choose a content playback device and browse the services (including a list of recently-accessed services if requested) and content options available through the services in state 96 and subsequent steps.

The second display 14i, using the local IP address returned as noted above, accesses the content playback device directly, in the sense of communicating through the local network. To select a particular content playback device, the second display 14i requests information about the content playback device 12 at state 70, including language information, digital rights management (DRM) information, etc., as desired, which information is returned from the content playback device to the second display 14*i* at state 72. Since the second display 14*i* knows the IP address of the content playback device 12 and consequently communicates directly with the content playback device 12, the second display 14*i* communicates using a local web address of the content playback device 12 that need not be globally addressable, and may so communicate as long as the second display 14*i* and content playback device 12 are on the same local network.

Each second display 14*i* may send the client information received at state 72 to the proxy server 22, requesting a list of services (including the list of recently-accessed services) available to the content playback device 12, or that the content playback device 12 is entitled to, from one or more of the content servers 24. The proxy server 22 relays the request to the management server 18, which returns the requested service list to the proxy server 22. The proxy server 22 in turn sends the services list to the second display for presentation of available services on the second display. Each user browses the services and their content on the second display just as though it were the actual content playback device.

A user can input, using, e.g., a second display input device, a selection of a service on the list that was returned to the second display. In response, the second display, at state 74, sends a request for the corresponding service to the proxy server 22 along with the service token that that second display may have received from the content server 24 via the management server 18.

Responsive to the request, the proxy server 22 requests a service login at state 86 of the content server 24 providing the selected service. At state 88, the content server 24 provides to the proxy server 22 a list of assets, categories or services, as the case may be, for the particular content server 24. If desired, the proxy server 22 may also request of the content server 24 a list of options, and the list may be returned in, e.g., extended markup language (XML) format to the proxy server 22 which relays the assets, categories, services, etc. available for selection to the second display at the state 80.

The content available for selection is presented on the second display so that the user can navigate (in state 97) the display to enter a selection. Responsive to the selection, the second display at state 98 sends a command to the content playback device 12 to play the selection, and in particular sends a playlist id or reference identifier indicating the selection. At state 100, the content playback device 12, using its authentication credentials, sends the playlist id or reference identifier to the proxy server 22, which returns the required playlist data in state 102. The content playback device 12 can then request the content URL with the playlist data in state 104, which may be responded to with a return of the content URL for playback of the asset on the content playback device 12 in state 106.

Variations of the system and method are now described.

If the content playback device were already playing content, the new content commanded to be played by the second display may be placed in a queue in the content playback device and played when the current content completes. In any case, once the content has been commanded to be played, the user may continue to browse the second display for other content, to play or add to the queue. Other users on the network may employ their own second displays to do the same. A user may also desire to switch devices and resume playback on a different device by, e.g., navigating to a "recently played" list as described below and selecting the last video played after switching control to the desired device.

The above description has been for the case where the proxy server 22 is employed to hide the content source, e.g., a content URL, from the second display 14*i*. That is, the proxy server 22 provides an API for the second display to use so that the content and/or content URL cannot be accessed directly. In this way, the details of the management server transactions to access the services remain desiredly unknown. In many cases, the second display 14*i* may have stored thereon little or no details about the content playback device 12. In some cases, however, the URL may be directly provided from the proxy server 22 or the proxy server 22 may even be bypassed, e.g., in cases where the asset is intended for free distribution, e.g., movie or game trailers or the like. Similarly, while the above description has focused on asset playback on content playback device 12, certain assets, e.g., those which are intended for free distribution, may be played back on the second display 14*i* itself, if the same has been appropriately configured.

In the case where multiple second displays request content to be played at or near the same time, a simple rule such as the first-in-time may prevail. Alternatively, a priority scheme may be configured, such that certain second displays take precedence over other second displays. Alternatively, a plurality of user profiles may be employed, and precedence may be based on the identity of specific users.

The control device may command the content playback device to play content by sending, to the content playback device over the local network, commands coded as if they were sent from an infrared remote control, e.g., the commands may be in the Sony Infrared Remote Control System (SIRCS) protocol.

Figure 3:
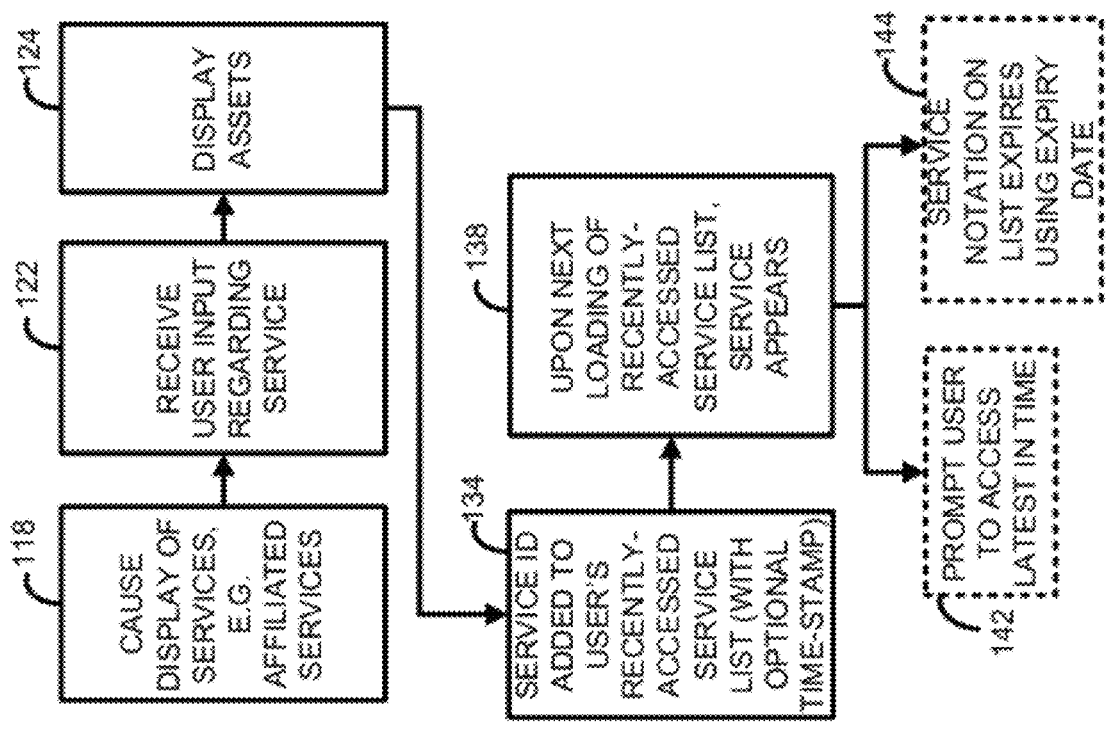
FIG. 3 is a flowchart illustrating an exemplary method according to a further aspect of the present principles, showing steps particularly appropriate to a server.

FIG. 3 is a flowchart 30 of a method including steps for causing a recently-accessed service list to be populated and steps for using a recently-accessed service list. The flow chart 30 may especially pertain to steps performed by a server.

Initially it is noted that, prior to the steps of flowchart 30, steps that may occur preliminarily include an establishment of a user account session between a second display and a server, e.g., via a second display application. The second display application may be a web application, a native application, or any other application by which a second display may communicate with the server. The session is generally associated with a user account, and the user generally enters logon credentials such as a username and password for access. Other variations will also be understood. The server may be a management server, a proxy server, or the like. A next step is to cause the display of a list of one or more content playback devices associated with the user account. The displayed content playback devices may become associated using a registration process. Other unregistered content playback devices may be displayed, e.g., those discovered by the second display, such as via Bluetooth®, infrared, or other such signal communication techniques. A final preliminary step is to receive user input regarding which content playback device is to be used. It is noted that not all the preliminary steps need be performed in every implementation. For example, a user may browse in some circumstances without a content playback device selected.

The first step shown on FIG. 3 is to display one or more services (step 118). Affiliated services are those associated with the user account. Other services may also be displayed, such as to introduce a user to the service and to encourage affiliation. In addition, when the list of services is fetched, the returned list may be a full list of recently-accessed services or a partial list that is based on the last time the list was fetched. Returning just a partial list has the advantage of saving on bandwidth and processing.

A next step is to receive user input regarding which service to browse (step 122). A user input may then be received regarding a service to be accessed. Once the service is selected and accessed, assets of the service may be displayed according to the configuration of the service. A request may be transmitted for an asset to a server, such as a management server, and the server processes the playback request.

On the management server, at least a minimal service identification is added to a user's recently-accessed service list (step 134), although the amount of data employed for identification is arbitrary. In one implementation, the service identification includes a timestamp, to identify when the service was accessed. The timestamp may generally be used to order the recently-accessed service list and to determine if services have expired. Subsequently, upon the next display of the recently-accessed service list, the service will appear (step 138). The user may select the service from the list to cause the corresponding service to be accessed, to resume access, or to perform other functions as described below. In an alternative implementation, instead of refreshing the list upon the next display, the list may also be updated at the time a service is accessed. For example, when the service is being accessed, the application may automatically move that service to the top of the list, as the same will be by definition the most recently-accessed.

In one variation, the second display application may prompt the user to access the service whose timestamp is latest in time (step 142). That is, by comparing the timestamps, the last in time may be determined and either accessed or offered for access. Such a step makes particularly convenient the continued access of a service by a user following an interruption. In another variation, a service entry on the recently-accessed service list may be caused to expire by the inclusion of an expiry date associated with the service (step 144). The same may allow the system to be organized with periodic cleaning procedures. For example, if the service is not accessed after a month, it may be dropped from the list.

Figure 4:
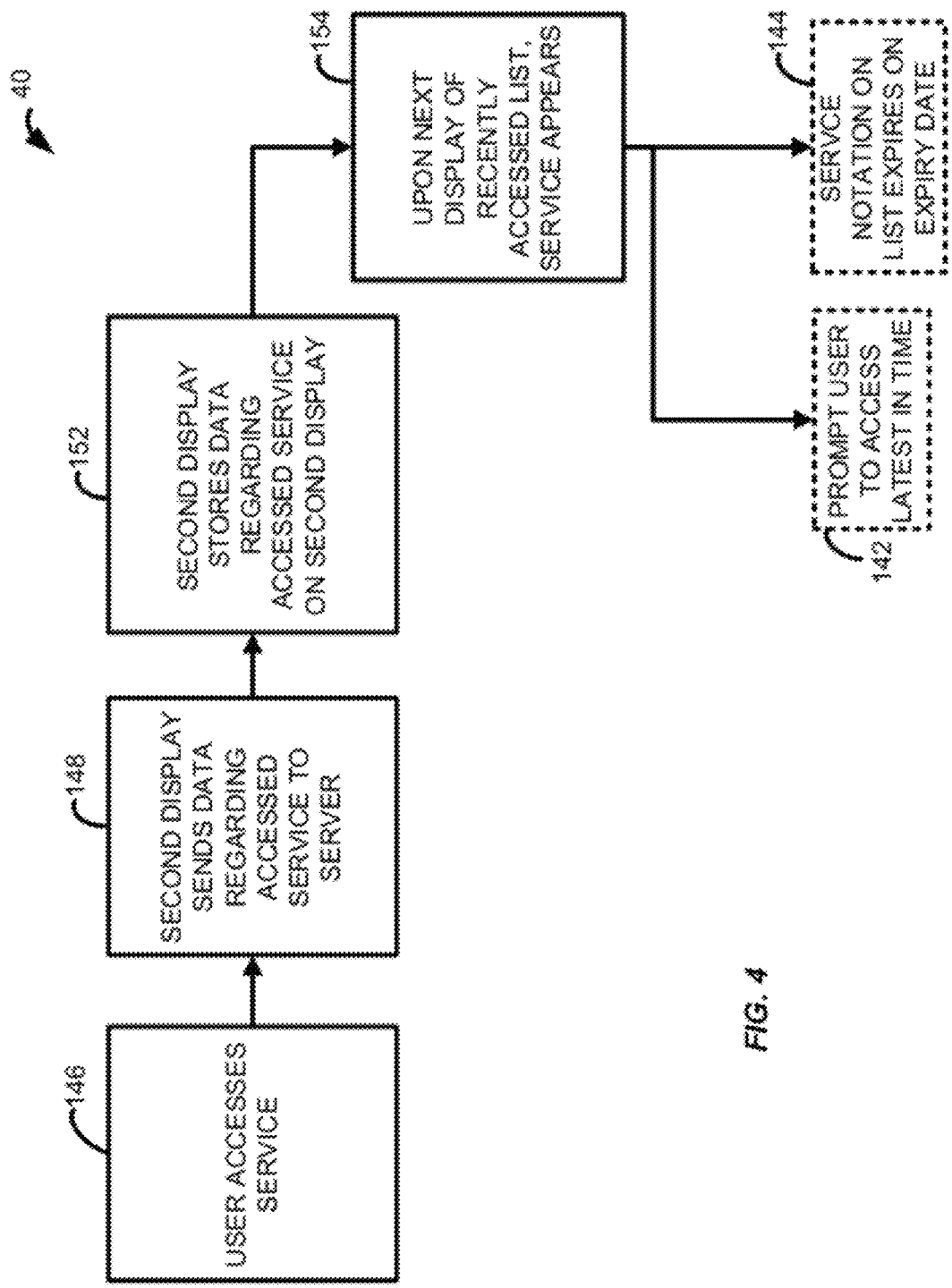
FIG. 4 is a flowchart illustrating an exemplary method according to yet another aspect of the present principles showing steps particularly appropriate to a second display.

Referring to FIG. 4, steps of a method are illustrated in flowchart 40, particularly as may be performed by a second display 14*i*. A first step is that the user accesses a service (step 146). Typically a user accesses a service using a second display application on a second display, although services may be accessed on a content playback device as well. A next step is that the second display application sends data regarding the accessed service, e.g., the service identification, to a server (step 148). A next step is that the second display stores data regarding the accessed service within the second display (step 152). Either step 148 or step 152 may be performed in a given implementation, or both. With step 148, which is performed anyway in most implementations, the server maintains the recently-accessed list. In step 152, the second display maintains the recently-accessed list. It is noted that step 148 may be automatically performed as the second display application uses the server to access the service, and thus there may be no requirement of separately sending data about the recently-accessed service for storage. In this case, the server logs the information when the application enters the service through the server. However, a separate informational call to the server may be employed if the application communicates with the service directly, instead of going through the server.

In any case, a next step is that, upon the next display of a recently-accessed list, an entry corresponding to the service accessed in step 146 appears (step 154). This next display may be called by a user using a menu, button, or other feature within the second display application, or may be automatically displayed by the second display, e.g., as a widget or other readily accessible list. The user may be prompted to access the most recently-accessed service (step 142), or the list may be displayed from which a user may choose a desired service from among those listed. As noted above, a service on the list may be provided with an expiry date, and the service may be removed from the list subsequent to that date (step 144). In this way, the list is maintained by a periodic cleaning procedure.

Figure 5:
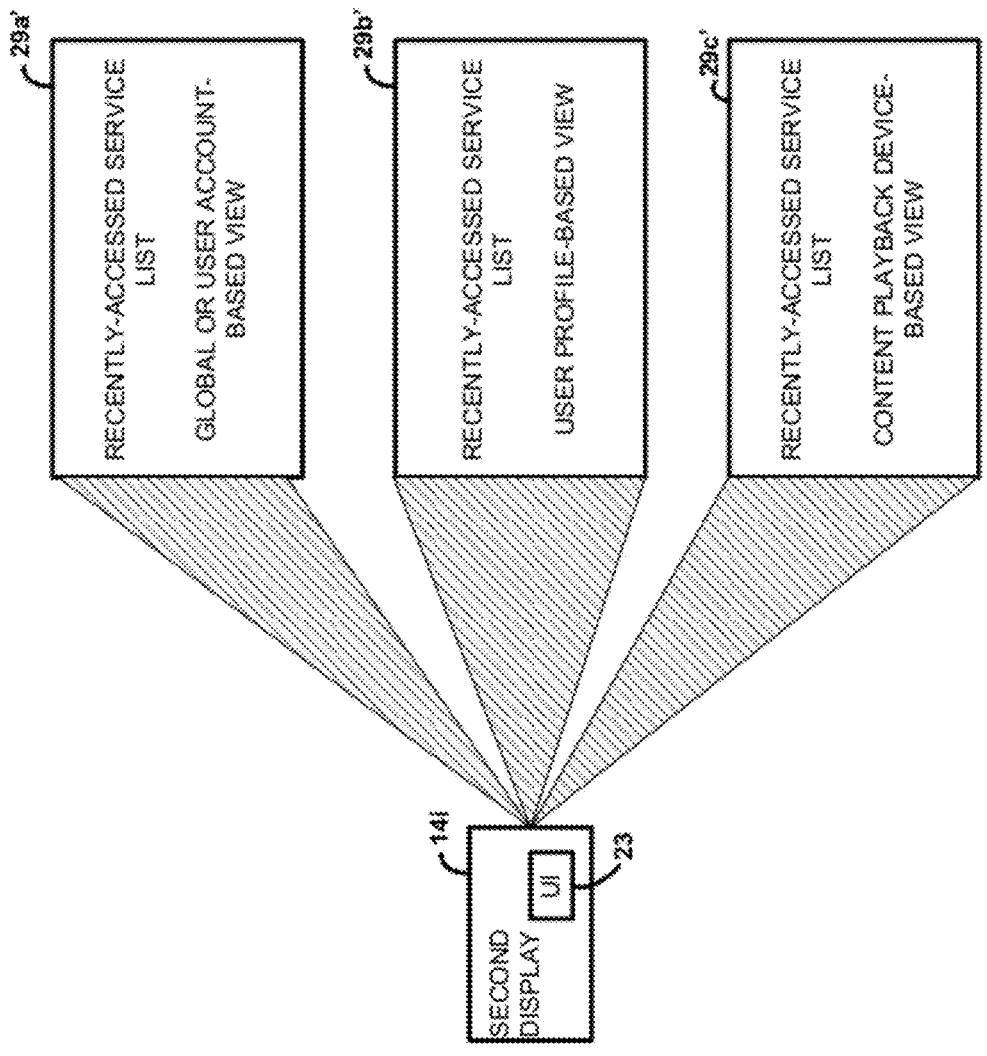
FIG. 5 is a diagram illustrating various types of recently-accessed service lists that may be presented on a user interface of a second display in accordance with another aspect of the present principles.

FIG. 5 schematically illustrates how different types of recently-accessed service lists may be portrayed on a user interface 23 of the second display 14*i*. Different lists may be generated because the scope of services taken into account in generating the lists may differ.

For example, a recently-accessed service list 29*a*' provides a global or user account-based view. In this view, the recently-accessed services from all second displays or content playback devices on the user account, or accessible to the user account, are considered. In other words, no matter which was used for selection, a set of the most recently-accessed services will appear.

By contrast, a recently-accessed service list 29*b*' provides a user profile-based view. In this view, a number of user profiles are associated with the user account. For example, each family member may have their own user profile. The recently-accessed service list may then be based on the user profile, so the recently-accessed services will be specific to the user. Upon logging onto the user profile, the displayed recently-accessed service list will include the most recently-accessed services directed to be accessed from that user profile, but will not include services directed to be accessed from other user profiles associated with the user account. Such a list may be convenient to allow a user to just focus on their own items of interest.

It is noted in this connection that the various lists as described may be combined, or multiple types of lists may be presented as alternatives for viewing by the user. In this way, a family member may view their own services of interest or may view what the rest of the family has watched. Moreover, certain user profiles may include special administrator privileges, so as to allow inspection of services accessed by other user profiles.

Another type of recently-accessed service list is that portrayed by list 29*c*', which is a content playback device-based view, where the displayed services are those which are the source of content items recently played back by a given content playback device. This type of list may be appropriate, e.g., for service access where the particular content playback device is the only one capable of playing the service. In an alternative implementation, a recently-accessed service list may be based not on a particular content playback device but on a category of content playback devices, such as IPTVs or audio receivers. In this way, a user may review recently-accessed services appropriate to a given type of content playback device. For example, if a user desires to listen to music, it would be superfluous for the recently-accessed service list to include video content, and thus the user could employ a list like 29*c*' to specifically look for recently-played audio assets. In an alternative embodiment, where a user has chosen a content playback device for playback, the recently-accessed service list may be automatically filtered based on the type of the chosen content playback device.

Other variations will also be seen. For example, a recently-accessed list may be based on a second display, where the services recently-accessed by each second display are respectively listed. In another variation, because the user account and user profile may allow a user to set up a friends list, a user may be enabled to view recently-accessed service lists of their friends. In another variation, a display may be provided to all or a subset of friends listing the most popular recently-accessed service list, where popularity is defined as the most accesses amongst a group of friends. In another implementation, a list of the most recently-accessed services may be displayed, weighted by the local or global popularity of the items. In either case, such lists allow users to discover services they may otherwise have missed.

It will be noted that numerous other variations of the above may be understood, the same being within the scope of the current principles.

Figure 6:
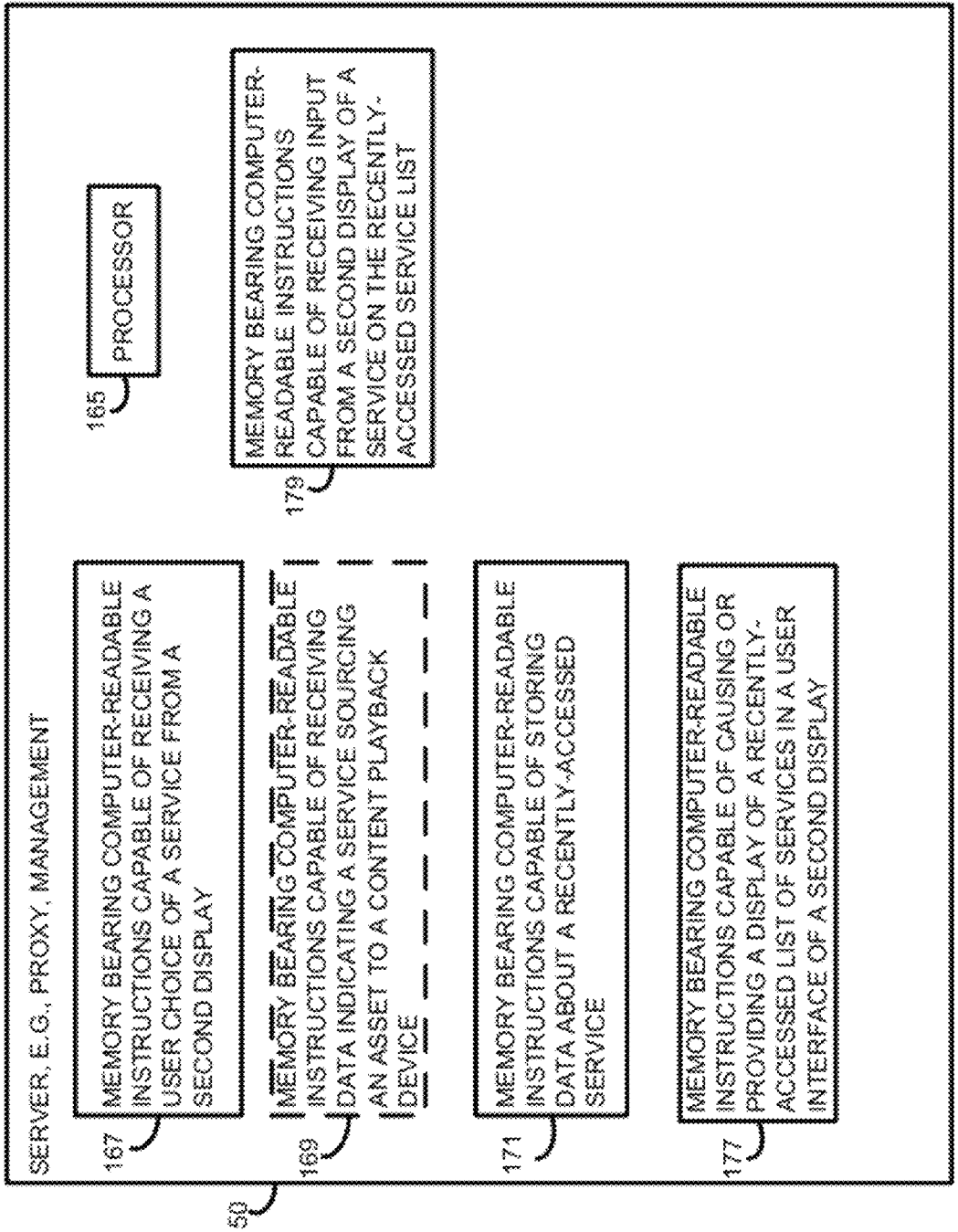
FIG. 6 is a block diagram of an exemplary server in accordance with another aspect of the present principles.

Referring to FIG. 6, an implementation of a server 50 is illustrated. In this implementation, the server includes various memory locations bearing computer-readable instructions capable of performing various steps. The server may be, e.g., a proxy server, a management server, or any other sort of server as described above. The server 50 includes a processor 165 and memory 167 bearing computer-readable instructions capable of receiving a user choice of a service from a second display. The server 50 may further include optional memory 169 bearing computer-readable instructions capable of receiving data indicating an accessed service sourcing a content item played on a content playback device. Generally the server 50 will include both memories 167 and 169, although in any given implementation only one is required.

The server 50 further includes memory 171 bearing computer-readable instructions capable of storing data about a user chosen service or an accessed service, e.g., in a recently-accessed service list. This memory takes the information from memories 167 or 169, or both, and compiles the same in the recently-accessed service list. Next, the server 50 includes memory 177 bearing computer-readable instructions capable of causing a display of the recently-accessed service list in a user interface of a second display. The memory 177 generally requires at least making a recently-accessed service list available for access by a second display, or making the data necessary to compile the list available to the second display. In the latter case, the second display generates the list based on the data. The data may be as minimal as just a service identification, in which case the second display retrieves any needed additional information from its own list of services, either as stored or as available from other sources. Finally, the server 50 includes memory 179 bearing computer-readable instructions capable of receiving a selection from a second display of a service on the recently-accessed service list, e.g., the input indicating that the service is to be accessed.

Figure 7:
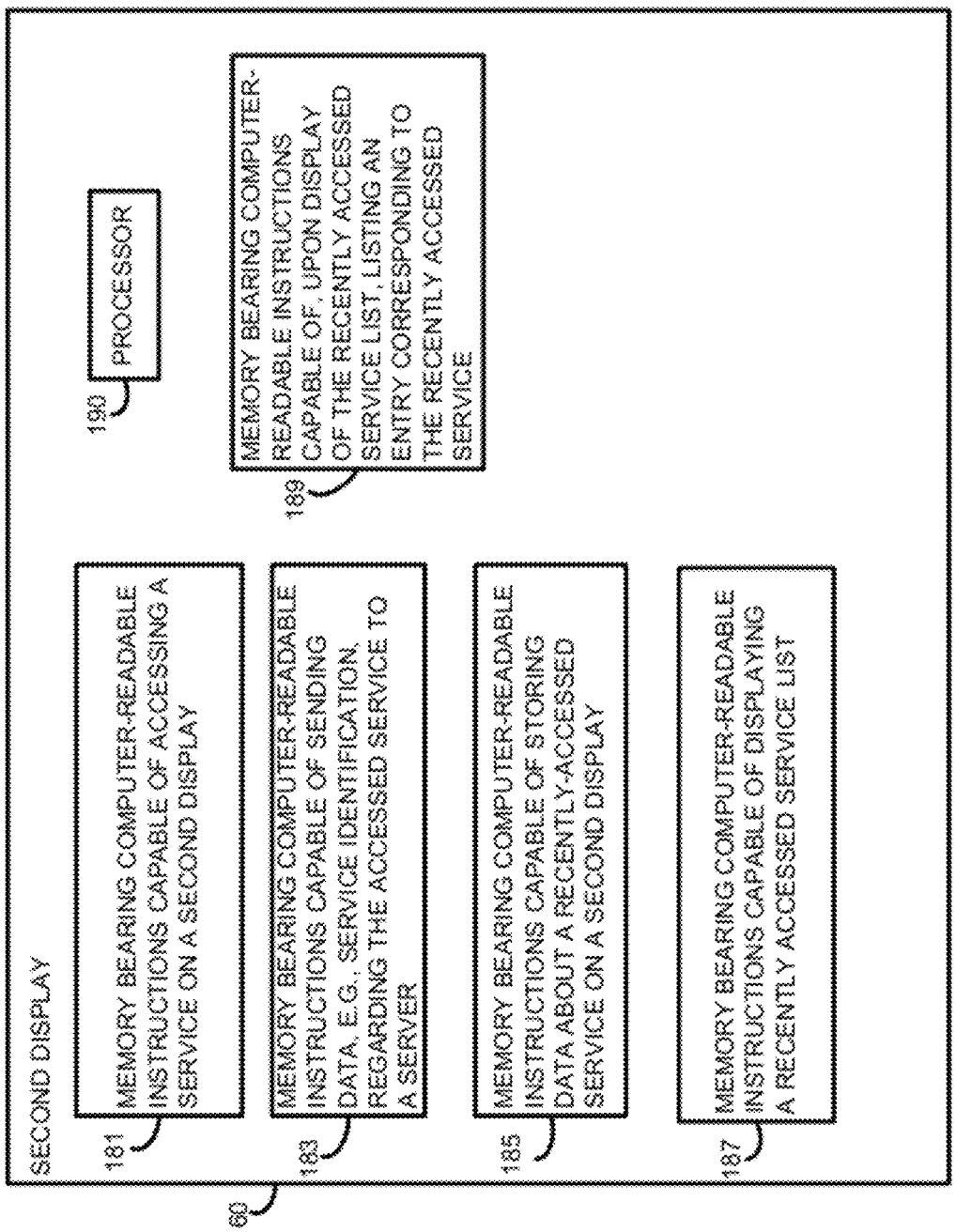
FIG. 7 is a block diagram of an exemplary second display in accordance with another aspect of the present principles.

Referring to FIG. 7, an implementation of a second display 60 is illustrated. In this implementation, as in FIG. 6, the second display includes various memory locations bearing computer-readable instructions capable of performing various steps. The second display may be, e.g., any of the types of computing devices as described above. The second display 60 includes a processor 190 and memory 187 bearing computer-readable instructions capable of accessing a service on a second display. The services are generally from a service provider, and may be grouped as a group of services accessible through a management server infrastructure. The second display 60 may further include memory 183 bearing computer-readable instructions capable of sending data regarding the accessed service to a server. The second display 60 may further include memory 185 bearing computer readable instructions capable of storing data about a recently-accessed service on a second display, i.e., storing the data locally. In this way, the system and method may be entirely run from the second display; however, such a system would lack information about services accessed from other second displays associated with the user account (unless such accesses are communicated amongst second displays, e.g., on a periodic basis, or stored in a network-accessible location). Generally the second display 60 will include both memories 183 and 185, although in a given implementation only one is required.

The second display 60 further includes memory 187 bearing readable instructions capable of displaying a recently-accessed list, i.e., a list of recently-accessed services. Finally, the second display 60 may include memory 189 bearing computer readable instructions capable of, upon display of the recently-accessed service list, listing or including an entry corresponding to the recently-accessed service. The same may be included at the top of the list, or may be included by itself, in either case indicating the service that was most recently-accessed. Other memories may also be included, such as those that allow for a prompting of the user to automatically return to the most recently-accessed service, or the like.

Other memories will also be understood, although these are not shown in FIGS. 6 and 7. For example, memories may be provided which bear computer-readable instructions capable of storing information about where in the service access ended, e.g., at a currently viewed category location of an accessed service, and upon request for a subsequent access of the service by the user, either initiating access at the current location or requesting if the user wishes to start access at a homepage of the service.

In an alternative implementation, these memories may be implemented as modules, either in software, hardware, or various forms of firmware. For example, a session module may be employed to establish user account sessions between the server and the second display. A database module may be employed to store the recently-accessed service list. Communications modules may be employed to provide data-transfer corresponding to services. Other modules will also be understood.

Systems and methods have been disclosed that allow improvement of the user experience of the IPTV without adding to the hardware costs of the unit. As disclosed above, users may employ the system and method to re-access a recently-accessed service without having to search for the same within the context of a service provider.

Figure 8:
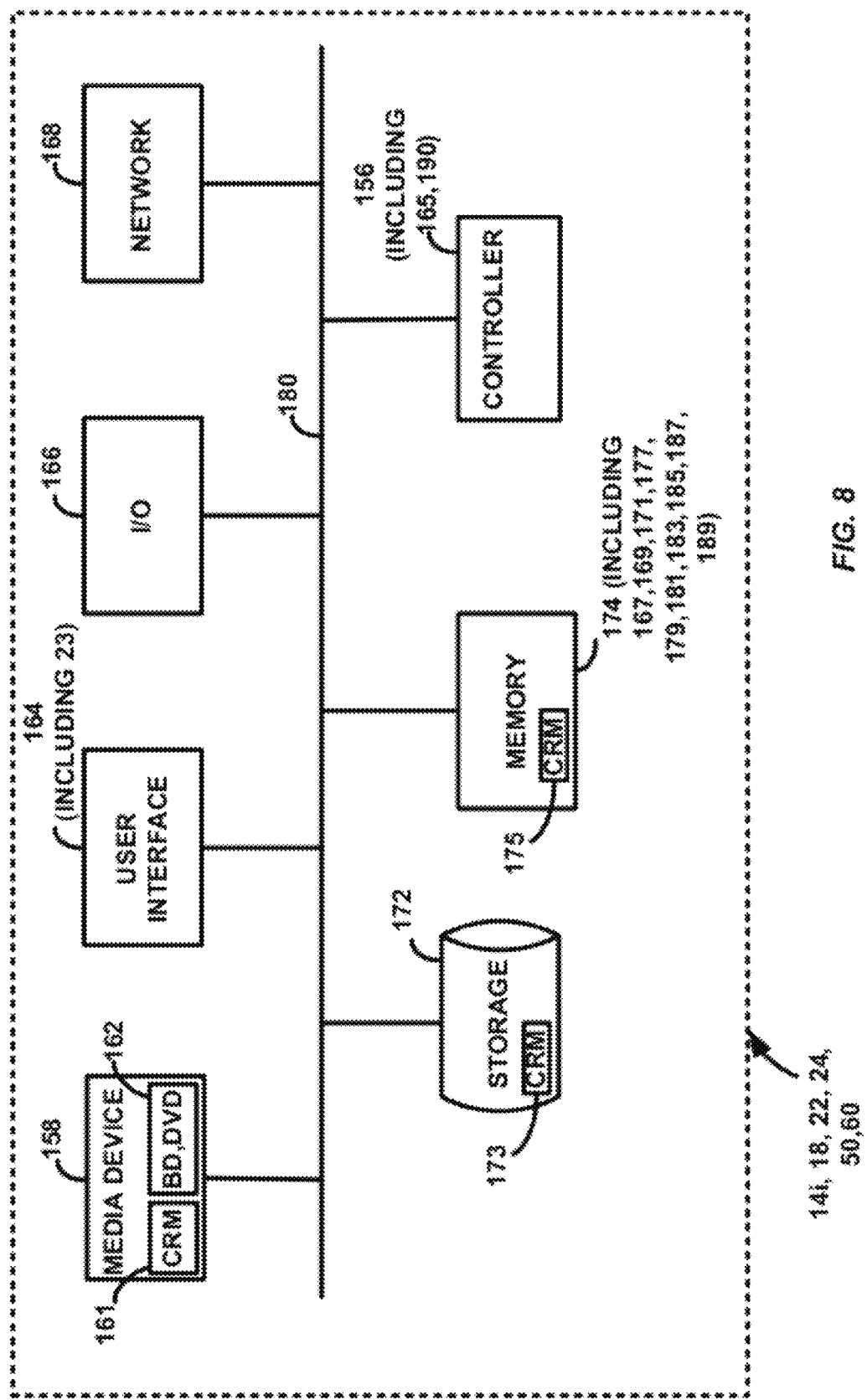
FIG. 8 illustrates an exemplary computing environment, e.g., that of the disclosed second display, proxy server, management server, or content server.

One implementation includes one or more programmable processors and corresponding computing system components to store and execute computer instructions, such as to execute the code that provides the second display 14 or various server functionality, e.g., that of the proxy server 22, management server 18, and content server 24. Referring to FIG. 8, a representation of an exemplary computing environment for a second display or for any of the servers is illustrated.

The computing environment includes a controller 156, a memory 174, storage 172, a media device 158, a user interface 164, an input/output (I/O) interface 166, and a network interface 168. The components are interconnected by a common bus 180. Alternatively, different connection configurations can be used, such as a star pattern with the controller at the center.

The controller 156 includes a programmable processor and controls the operation of the second display and servers and their components. The controller 156 loads instructions from the memory 174 or an embedded controller memory (not shown) and executes these instructions to control the system. In its execution, the controller 156 may provide the second display control of a content playback device system as, in part, a software system. Alternatively, this service can be implemented as separate modular components in the controller 156 or the second display.

Memory 174, which may include non-transitory computer-readable memory 175, stores data temporarily for use by the other components of the second display and servers, and the same may include memories 167, 169, 171, 177, 179, 181, 183, 185, 187, and 189 as discussed above. In one implementation, memory 174 is implemented as RAM. In other implementations, memory 174 also includes long-term or permanent memory, such as flash memory and/or ROM.

Storage 172, which may include non-transitory computer-readable memory 173, stores data temporarily or long-term for use by other components of the second display and servers, such as for storing data used by the system. In one implementation, storage 172 is a hard disc drive or a solid state drive.

The media device 158, which may include non-transitory computer-readable memory 161, receives removable media and reads and/or writes data to the removable media. In one implementation, the media device 158 is an optical disc drive or disc burner, e.g., a writable Blu-ray® disc drive 162.

The user interface 164 includes components for accepting user input from the user of the second display, and presenting information to the user. In one implementation, the user interface 164 includes a keyboard, a mouse, audio speakers, and a display. The controller 156 uses input from the user to adjust the operation of the second display 14$i$.

The I/O interface 166 includes one or more I/O ports to connect to corresponding I/O devices, such as external storage or supplemental devices, e.g., a printer or a PDA. In one implementation, the ports of the I/O interface 166 include ports such as: USB ports, PCMCIA ports, serial ports, and/or parallel ports. In another implementation, the I/O interface 166 includes a wireless interface for wireless communication with external devices. These I/O interfaces may be employed to connect to one or more content playback devices.

The network interface 168 allows connections with the local network and optionally with content playback device 12 and includes a wired and/or wireless network connection, such as an RJ-45 or Ethernet connection or "WiFi" interface (802.11). Numerous other types of network connections will be understood to be possible, including WiMax, 3G or 4G, 802.15 protocols, 802.16 protocols, satellite, Bluetooth®, infrared, or the like.

The second display and servers may include additional hardware and software typical of such devices, e.g., power and operating systems, though these components are not specifically shown in the figure for simplicity. In other implementations, different configurations of the devices can be used, e.g., different bus or storage configurations or a multi-processor configuration.

Various illustrative implementations of the present invention have been described. However, one of ordinary skill in the art will recognize that additional implementations are also possible and within the scope of the present invention. For example, the ordering of recently-accessed services may be performed by the second display, rather than a server. Moreover, while media content services have been focused on, the user may also browse, and store in a recently-accessed service list, services for other types of business or consumer transactions, such as video rentals, home shopping sites, or the like on the second display.

While the system and method have described implementations in which content playback devices have been selected by a user before browsing, numerous other variations are possible. For example, a cache or cookie or other information may be employed to store information about content playback devices, so that no user choice is necessary. In another example, samples of assets, e.g., movie trailers, may be obtained from content service providers, and these samples may be browsed freely without a user selection of a content playback device for playback even including playback on the second display if supported. In another variation, a profile system may be employed that communicates content playback device information upon start-up according to a profile; e.g., a given content playback device may always be associated with and may authenticate itself with a given service provider. In this sense, a content playback device is still being chosen, but the choice does not require an affirmative step by the user. Use of any of these alternatives, or others, ensures that the content consumption of each content playback device is tracked. It further allows, as described, the proxy server to filter out content that the content playback device is incapable of playing. Even where browsing requires no device choice at all, e.g., browsing shopping sites, some level of customization may occur, e.g., by consideration of the origination location of the visiting second display's IP address.

In addition, the above description was primarily directed to implementations in which the local IP address of the second display was retrieved and stored on the server. However, other ways of discovering the second display are also possible. For example, device discovery is also possible using a broadcast method within the local network. Compatible devices that recognize the broadcast message will respond with their necessary credentials and information to indicate their compliance with the application for the second display. In many cases, broadcasting methods are primarily directed to native applications, not web applications; however, a broadcasting library may be employed to allow the implementation even within a web application.

While the above description has focused on implementations where a second display is coupled to a content playback device through a local network or over the internet, it will be understood that the same will apply to any method by which the two may communicate, including 3G, 4G, and other such schemes.

Accordingly, the present invention is not limited to only those implementations described above.

The invention claimed is:

1. A method of enabling a user to return to a recently-accessed service, comprising:
   i. upon access of a service on a second display, where the second display is configured to browse the service using an authentication credential of an associated content playback device by accessing a proxy server associated with the service or a management server or both, such that the proxy server presents to the service the authentication credentials of the content playback device, such that the second display appears to the service as an authenticated content playback device, logging a notation of the access along with a time stamp on a list, such that a recently-accessed service list is created, the recently-accessed service list stored on the management server, the management server providing access to a plurality of service providers; and ii. upon request by the second display, or upon request by a different second display, the different second display in network communication with the management server, providing the recently-accessed service list for display on the second display or on the different second display;

iii. wherein a content source of an asset associated with the service is hidden from the second display.

2. The method of claim 1, wherein the providing includes generating a recently-accessed service list including formatting the recently-accessed service list for display on a number of different types of second displays, the types of second displays including: a tablet computer, a smart phone, a laptop computer, an internet appliance, or a computing device with internet access.

3. The method of claim 1, wherein the access of a service on the second display includes playback of an asset from an accessed service on the associated content playback device, and wherein the logging is performed upon the playback of the asset.

4. The method of claim 2, wherein the providing further comprises ordering the generated recently-accessed service list according to timestamp.

5. The method of claim 1, further comprising receiving a request for a service on the recently-accessed service list to be accessed, the request sent from the second display or the different second display.

6. The method of claim 5, further comprising causing the requested service to be accessed.

7. The method of claim 1, wherein at least one service on the recently-accessed service list has associated therewith an expiration date, and further comprising, on or after the expiration date, removing the service from the recently-accessed service list.

8. The method of claim 1, further comprising logging data about a device characteristic of the associated content playback device, and wherein the recently- accessed service list is specific to the content playback device having the device characteristic.

9. The method of claim 1, wherein the logging includes data about a current location within the accessed service, such that upon a subsequent request for the service, the service access begins at the current location.

10. The method of claim 9, wherein the current location is a category page.

11. The method of claim 1, wherein the logging includes data about a current location, and further comprising, upon a subsequent request to access the service, displaying a prompt on the second display requesting the service, inquiring as to whether access should start at a homepage of the service or at the current location.

12. The method of claim 2, further comprising filtering the generated recently-accessed service list based on a regional ruleset corresponding to a region in which the content playback device resides.

13. A non-transitory computer-readable medium, comprising instructions for causing a computing device to implement the method of claim 1.

14. A method of enabling a user to access a recently-accessed service on a second display, comprising:

i. accessing a service on a second display, wherein the second display is configured to browse the service using an authentication credential of an associated content playback device by accessing a proxy server associated with the service or a management server or both, such that the proxy server presents to the service the authentication credentials of the content playback device, such that the second display appears to the service as an authenticated content playback device, transmitting data about the service accessed to the management server, the management server providing access to a plurality of services; and ii. displaying on the second display, or on a different second display in network communication with the management server, a most recently-accessed service or a recently-accessed service list, the list including entries corresponding to the most recently-accessed services;

iii. wherein a content source of an asset associated with the service is hidden from the second display.

15. The method of claim 14, wherein the second display is a tablet computer, a smart phone, a laptop computer, an internet appliance, or a computing device with internet access.

16. The method of claim 14, further comprising associating a timestamp with the transmitted data.

17. The method of claim 16, further comprising ordering the recently-accessed service list on the second display according to timestamp.

18. The method of claim 14, further comprising transmitting a request to access a service on the recently-accessed service list.

19. The method of claim 14, further comprising transmitting a current location in the service to the management server.

20. The method of claim 19, further comprising:

i. transmitting a request for a service on the recently-accessed service list;

ii. receiving a request for user input, the request inquiring as to whether access of the service should be at a homepage of the service or at the current location in the service; and iii. transmitting a response to the request for user input to the management server.

21. The method of claim 14, wherein the recently-accessed service list is specific to the second display or to the different second display.

22. The method of claim 14, wherein the recently-accessed service list is specific to a user account or a user profile on the user account.

23. The method of claim 14, wherein the recently-accessed service list is specific to a device characteristic of the associated content playback device or to a device characteristic of a category of content playback devices.

24. The method of claim 22, further comprising filtering the recently-accessed service list based on a regional ruleset corresponding to a region in which the associated content playback device resides.

25. A non-transitory computer-readable medium, comprising instructions for causing a computing device to implement the method of claim 14.

* * * * *